Nov. 7, 1967 J. S. KILBY 3,350,760

CAPACITOR FOR MINIATURE ELECTRONIC CIRCUITS OR THE LIKE

Original Filed Feb. 6, 1959 4 Sheets-Sheet 1

INVENTOR

Jack S. Kilby

BY John W. [signature]

ATTORNEY

Nov. 7, 1967 J. S. KILBY 3,350,760

CAPACITOR FOR MINIATURE ELECTRONIC CIRCUITS OR THE LIKE

Original Filed Feb. 6, 1959 4 Sheets-Sheet 2

INVENTOR
Jack S. Kilby

BY John D. Graham

ATTORNEY

INVENTOR
Jack S. Kilby
BY John D. Graham
ATTORNEY

INVENTOR
Jack S. Kilby

BY

ATTORNEY

United States Patent Office 3,350,760
Patented Nov. 7, 1967

3,350,760
CAPACITOR FOR MINIATURE ELECTRONIC CIRCUITS OR THE LIKE

Jack S. Kilby, Dallas, Tex., assignor to Texas Instruments Incorporated, Dallas, Tex., a corporation of Delaware Original application Feb. 6, 1959, Ser. No. 791,602, now Patent No. 3,138,743, dated June 23, 1964. Divided and this application Mar. 16, 1964, Ser. No. 352,389
4 Claims. (Cl. 29—25.42)

Figure 1:
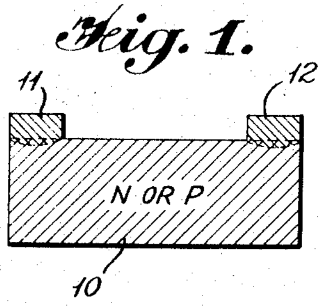

This invention relates to dielectric devices and more particularly to a capacitor using an oxide of a semiconductor material as a dielectric. In a preferred embodiment, the semiconductor material is silicon and the dielectric is silicon oxide. The dielectric devices of this invention have particular utility in integrated electronic circuits of the type wherein circuit components are fabricated in or on a body of single-crystal semiconductor material.

This application is a division of my co-pending application S.N. 791,602, filed Feb. 6, 1959, now issued as Patent No. 3,138,743.

Many methods and techniques for miniaturizing electronic circuits have been proposed in the past. At first, most of the effort was spent upon reducing the size of the components and packing them more closely together. Work directed toward reducing component size is still going on but has nearly reached a limit. Other efforts have been made to reduce the size of electronic circuits such as by eliminating the protective coverings from components, by using more or less conventional techniques to form components on a single substrate, and by providing the components with a uniform size and shape to permit closer spacings in the circuit packaging therefor.

All of these methods and techniques require a very large number and variety of operations in fabricating a complete circuit. For example, of all circuit components, resistors are usually considered the most simple to form, but when adapted for miniaturization by conventional techniques, fabrication requires at least the following steps:

(a) Formation of the substrate.
(b) Preparation of the substrate.
(c) Application of terminations.
(d) Preparation of resistor material.
(e) Application of the resistor material.
(f) Heat treatment of the resistor material.
(g) Protection or stabilization of the resistor.

Capacitors, transistors, and diodes when adapted for miniaturization each require at least as many steps in the fabrication thereof. Unfortunately, many of the steps required are not compatible. A treatment that is desirable for the protection of a resistor may damage another element, such as a capacitor or transistor, and as the size of the complete circuit is reduced, such conflicting treatments, or interactions, become of increasing importance. Interactions may be minimized by forming the components separately and then assembling them into a complete package, but the very act of assembly may cause damage to the more sensitive components.

Because of the large number of operations required, control over miniaturized circuit fabrication becomes very difficult. To illustrate, many raw materials must be evaluated and controlled even though they may not be well understood. Further, many testing operations are required and, even though a high yield may be obtained for each operation, so many operations are required that the over-all yield is often quite low. In service, the reliability of a circuit produced by methods of such complexity may also be quite low due to the tremendous number of controls required. Additionally, the separate formation of individual components requires individual terminations for each component. These terminations may eventually become as small as a dot of conductive paint. However, they still account for a large fraction of the usable area or volume of the circuit and may become an additional cause of circuit failure or rejection due to misalignment.

In contrast to the approaches to miniaturization that have been made in the past, the present invention has resulted from a new and totally different concept for miniaturization. Radically departing from the teachings of the art, it is proposed by the invention that miniaturization can best be attained by use of as few materials and operations as possible. In accordance with the principles of the invention, the ultimate in circuit miniaturization is attained using only one material for all circuit elements and a limited number of compatible process steps for the production thereof.

The above is accomplished by the present invention by utilizing a body of semiconductor material exhibiting one type of conductivity, either n-type or p-type, and having formed therein a diffused region or regions of appropriate conductivity type to form a p-n junction between such region or regions and the semiconductor body or, as the case may be, between diffused regions. According to the principles of this invention, all components of an entire electronic circuit are fabricated within the body so characterized by adapting the novel techniques to be described in detail hereinafter. It is to be noted that all components of the circuit are integrated into the body of semiconductor material and constitute portions thereof.

In a more specific conception of the invention, all components of an electronic circuit are formed in or near one surface of a relatively thin semiconductor wafer characterized by a diffused p-n junction or junctions. Of importance to this invention is the concept of shaping. This shaping concept makes it possible in a circuit to obtain the necessary isolation between components and to define the components or, stated differently, to limit the area which is utilized for a given component. Shaping may be accomplished in a given circuit in one or more of several different ways. These various ways include actual removal of portions of the semiconductor material, specialized configurations of the semiconductor material such as long and narrow, L-shaped, U-shaped, etc., selective conversion of intrinsic semiconductor material by diffusion of impurities thereinto to provide low resistivity paths for current flow, and selective conversion of semiconductor material of one conductivity type to conductivity of the opposite type wherein the p-n junction thereby formed acts as a barrier to current flow. In any event, the effect of shaping is to direct and/or confine paths for current flow thus permitting the fabrication of circuits which could not otherwise be obtained in a single wafer of semiconductor material. As a result, the final circuit is arranged in essentially planar form. It is possible to shape the wafer during processing and to produce by diffusion the various circuit elements in a desired and proper relationship. Certain of the resistor and capacitor components described herein have utility and novelty in and of themselves although they are completely adaptable to and perhaps find their greatest utility as integral parts of the semiconductor electronic circuit hereof.

It is, therefore, a principal object of this invention to provide a novel miniaturized electronic circuit fabricated from a body of semiconductor material containing a diffused p-n junction wherein all components of the electronic circuit are completely integrated into the body of semiconductor material.

It is another principal object of this invention to produce desired circuits by appropriately shaping a wafer of semiconductor material to obtain the necessary isolation between components thereof and to define the areas utilized by such components.

It is a further object of this invention to provide a unique miniaturized electronic circuit fabricated as described whereby the resulting electronic circuit will be substantially smaller, more compact, and simpler than circuit packages heretofore developed using known techniques.

It is a still further object of this invention to provide novel miniaturized electronic circuits fabricated as described above which involve less processing than techniques heretofore used for this purpose.

It is another object of this invention to provide novel resistor and capacitor circuit components.

Figure 6A:
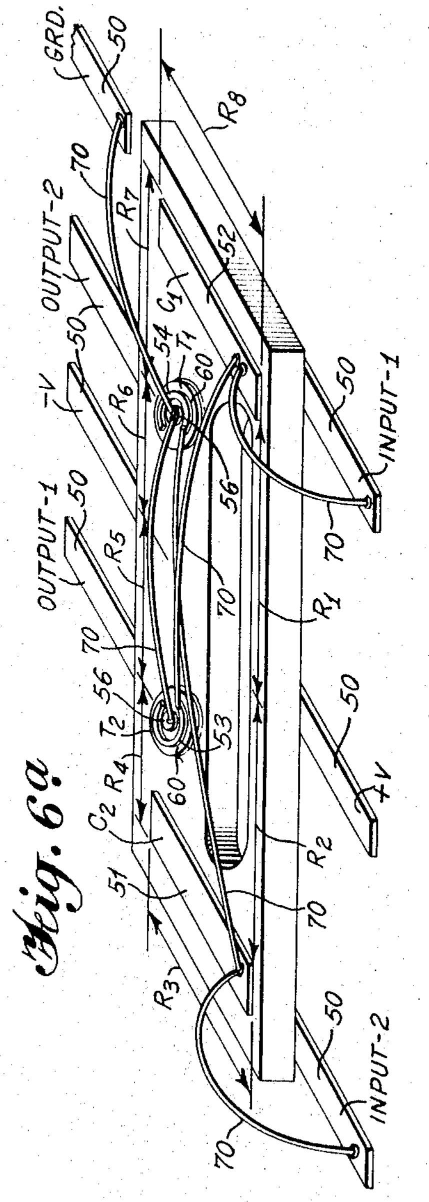
Figure 6B:
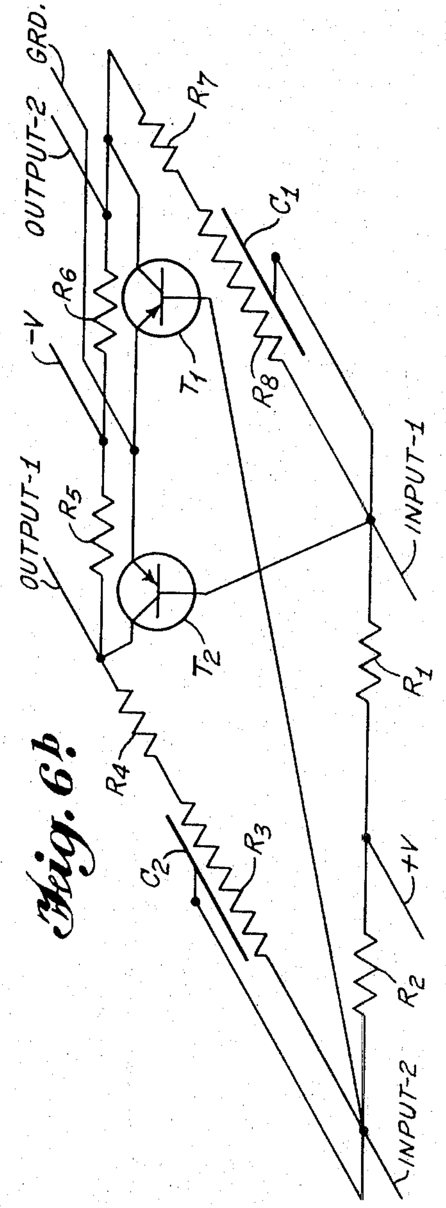
Figure 7:
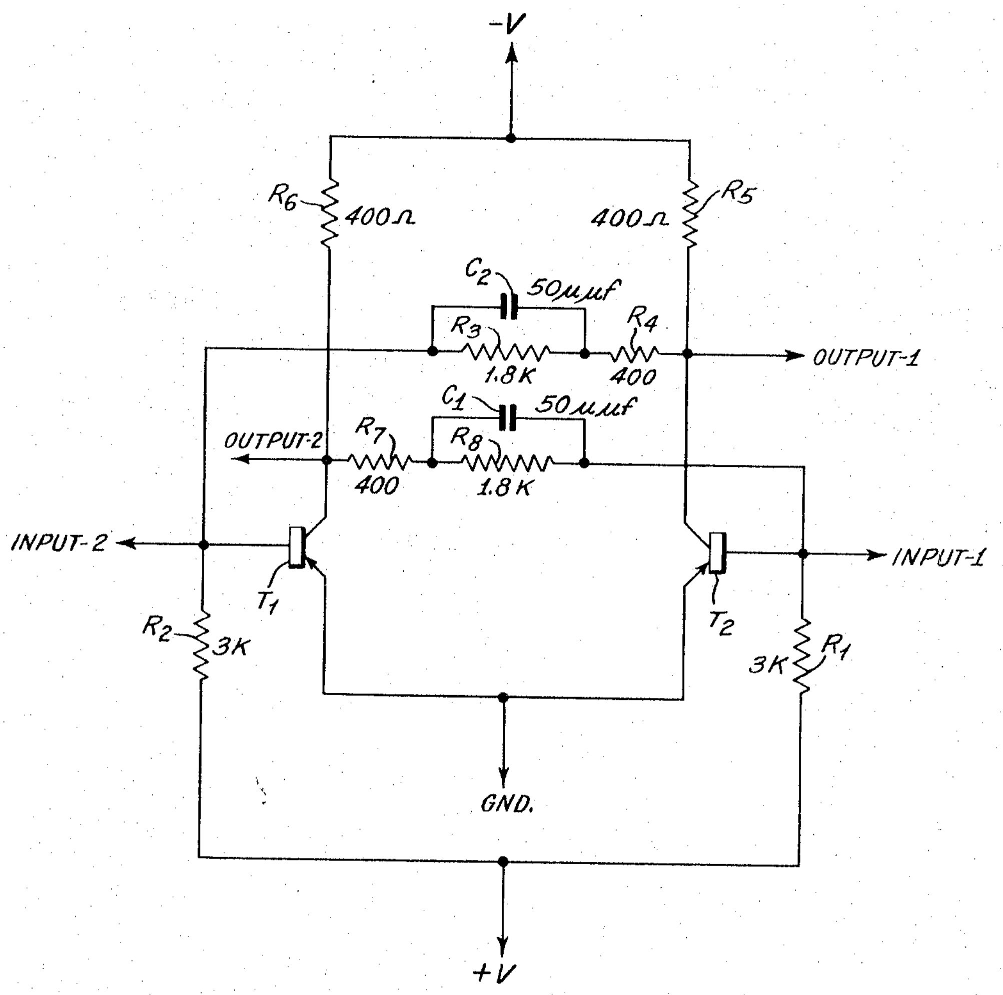
Figures 8A, 8B, 8C:
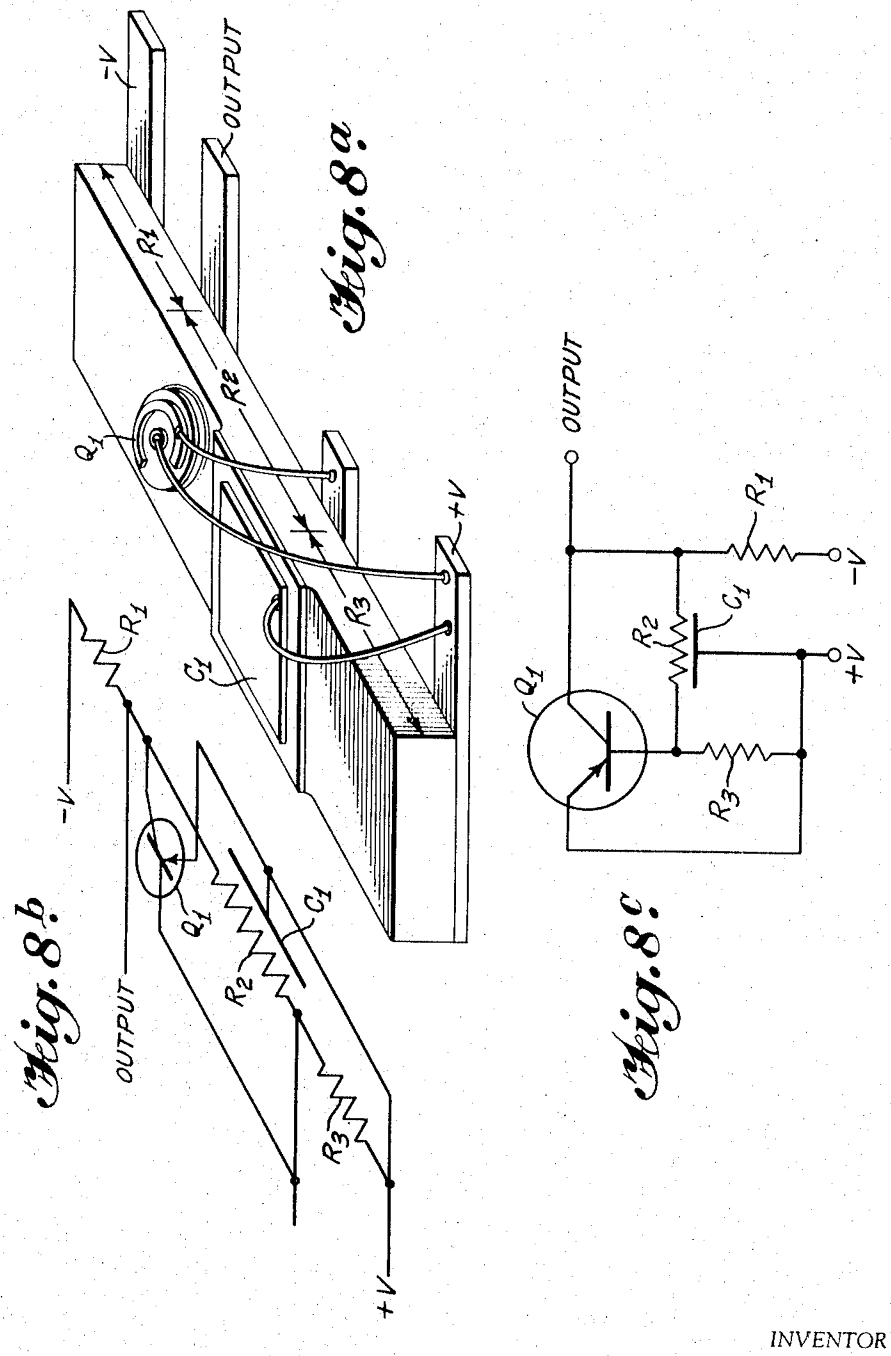

Other and further objects of the present invention will become more readily apparent from the following detailed description of preferred embodiments of the present invention when taken in conjunction with the appended drawings, in which:

FIGURES 1–5*a* illustrate schematically various circuit components fabricated in accordance with the principles of the present invention in order that they may be integrated into, or as they constitute parts of, a single body of semiconductor material;

FIGURE 6*a* illustrates schematically a multivibrator circuit fabricated in accordance with the present invention;

FIGURE 6*b* shows the wiring diagram for the multivibrator circuit of FIGURE 6*a* laid out in the same relationship;

FIGURE 7 illustrates the wiring diagram of the multivibrator circuit of FIGURE 6*a* in a more conventional presentation;

FIGURE 8*a* illustrates schematically a phase shift oscillator fabricated in accordance with the principles of the present invention;

FIGURE 8*b* shows the wiring diagram for FIGURE 8*a* with the components laid out in the same relationship; and FIGURE 8*c* portrays the wiring diagram of the phase shift oscillator.

Referring now to the drawings in detail, preferred embodiments of the present invention will now be described in detail in order that a better understanding of the principles of the invention and the various forms and embodiments of the invention will be better understood.

As noted previously, the invention is primarily concerned with miniaturization of electronic circuits. Also, as noted, the invention contemplates the use of a body of semiconductor material appropriately shaped and having formed therein a diffused p-n junction of junctions and the use of component designs for the various circuit elements or components which can be integrated into or which constitute parts of the aforesaid body of semiconductor material.

FIGURES 1–5 inclusive illustrate in detail circuit elements designed in accordance with the principles of this invention which can be integrated into a body of semiconductor material. It is noted at this point that the body of semiconductor material is of single crystal structure, and can be composed of any suitable semiconductor material. There may be mentioned as examples of suitable materials germanium, silicon, intermetallic alloys such as gallium arsenide, aluminum antimonide, indium antimonide, as well as others.

Referring particularly to FIGURE 1, there is shown a typical design for a resistor which may be embodied or integrated into a body of single crystal semiconductor material. As noted in FIGURE 1, the design contemplates utilizing the bulk resistance of a body 10 of a semiconductor material of either n- or p-type conductivity. Contacts 11 and 12 are made ohmically to one surface of the body 10, spaced apart a sufficient distance to achieve a desired resistance. If two resistors are to be connected together, it is not necessary to provide separate terminations for the common point. The resistance may be calculated from $$R=\rho L/A$$

where L is the active length in centimeters, A is the cross sectional area, and $\rho$ is the resistivity in ohm-cm. of the semiconductor material.

Figure 1A:
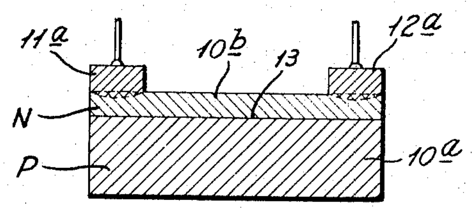

In addition to the resistor shown in FIGURE 1, a resistor may be provided as shown in FIGURE 1*a* for integration into and as forming a part of a body of semiconductor material. In FIGURE 1*a*, there is shown a body **10*a* of p-type semiconductor material with an n-type region 10*b* formed therein. Of course, between the body 10*a* and region 10*b* there is a p-n junction which is designated by the numeral 13. Contacts 11*a* and 12*a* are made to one surface of the region 10*b*, spaced apart from each other in order to achieve a desired resistance. As in FIGURE 1, the contacts 11*a* and 12*a* are ohmic contacts to the region 10*b***. A resistor formed in the manner of FIGURE 1*a* has several important advantages. First, the p-n junction 13 provides a barrier to current flow from the n-type region **10*b* into the p-type body 10*a* and, thus, the current flow is confined to a path in the n-type region 10*b* between the contacts thereto. The second advantage is that the total resistance value thereof can be controlled to a large degree. The total resistance value may be controlled by etching very lightly over the entire surface to remove the uppermost portion of the n-type region 10*b*, being very careful to not etch through the p-n junction, and as well by selectively etching to or through the p-n junction 13** thereby effectively to increase the length of the path traveled by the current between the contacts. The third, and perhaps major, advantage in forming a resistor according to FIGURE 1*a* is in that, by controlling the doping level or impurity concentration in the n-type region **10*b*, lower and more nearly constant temperature coefficients may be provided for the resistor. The above description has been in terms of a p-type body 10*a* and an n-type region 10*b* but it is obvious that the body 10*a* could be equally as well of n-type conductivity and the region 10*b*** of p-type conductivity. The resistors of FIGURE 1*a* may be formed as separate circuit elements or components.

Figure 2:
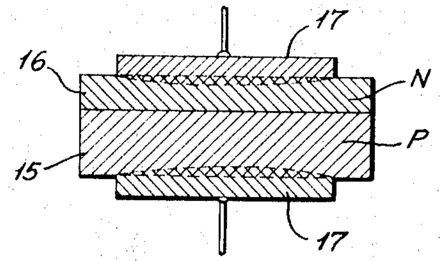

Capacitor designs may be obtained by utilizing the capacitance of a p-n junction, as shown in FIGURE 2, wherein a semiconductor wafer 15 of p-type conductivity is shown containing an n-type diffused layer 16. Ohmic contacts 17 are made to opposite faces of the wafer 15. The capacitance of a diffused junction is given by $$C=A\epsilon\left(\frac{qa}{12\epsilon V}\right)^{1/3}$$

where A is the area of the junction in square cm., $\epsilon$ is the dielectric constant, $q$ is electronic charge, and V is the applied voltage.

Figure 2A:
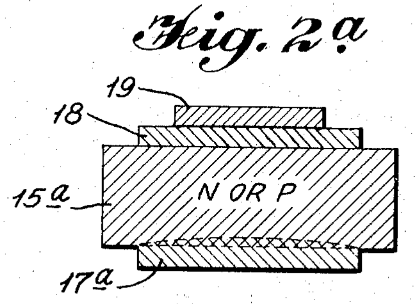

Instead of the capacitor of FIGURE 2, capacitance in a body of single crystal of semiconductor material may be provided as shown and described in connection with FIGURE 2*a*. FIGURE 2*a* shows a body **15*a* of semiconductor material, of either n- or p-type conductivity, which constitutes one plate of the capacitor. Evaporated onto the body 15*a* is a layer 18 providing a dielectric layer for the capacitor. It is necessary that the layer 18 have a suitable dielectric constant and be inert when in contact with the semiconductor body 15*a*. Silicon oxide has been found to be a suitable material for dielectric layer 18 and may be applied by evaporation or thermal oxidation techniques onto body 15*a*. Plate 19 forms the other plate of the capacitor and is provided by evaporating a conductive material onto layer 18. Gold and aluminum have been found to be satisfactory materials for the plate 19. Ohmic contact 17*a* is made to the body of semiconductor material 15*a* and contact to plate 19** may be made by any suitable electrical contact (not shown). Capacitors formed in the manner described in connection with FIGURE 2*a* have been found to provide much more stable capacitors than pure junction capacitors, that is, p-n junction capacitors, and, of course, may be fabricated as separate elements or components.

Capacitors produced in the manner of FIGURE 2 are also diodes, and must therefore be properly polarized in the circuit. Non-polar capacitors may be made by connecting two such areas back-to-back. Although junction capacitors have a marked voltage dependence, such dependence is present to a lesser degree for low voltages in the non-polar configuration.

Figure 3:
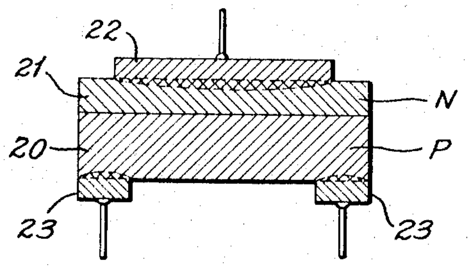

Resistor and capacitor designs may be combined to form a distributed R-C network. Such is shown in FIGURE 3, wherein a wafer 20 of p-type conductivity having an n-type conductivity diffused layer 21 formed therein is provided with a broad area contact 22 on the face and spaced contacts 23 on the opposite face. These networks are useful for low pass-filters, phase shift networks, coupling elements, etc. Their parameters may be calculated from the equations above. Other configurations of this general type are also possible.

Figure 5:
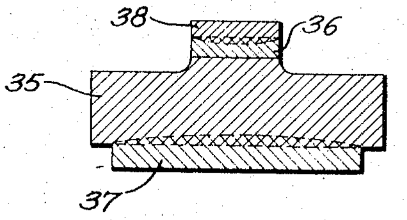
Figure 4:
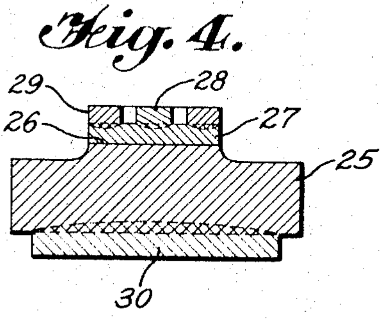

Transistors and diodes may be formed on a wafer, as described by Lee in BSTJ, vol. 35, p. 23 (1956). This reference describes a transistor, as shown in FIGURE 4, which has a collector region 25, a diffused p-n junction 26, a base layer 27, an emiter contact 28 forming a rectifying connection with base layer 27 and base and collector contacts 29 and 30, respectively. The base layer 27 is formed as a mesa of small cross section. A diode of similar design is shown in FIGURE 5, and consists of a region 35 of one type conductivity, a mesa region 36 of opposite conductivity type with a p-n diffused junction formed therebetween and contacts 37 and 38 to each region.

Figure 5A:
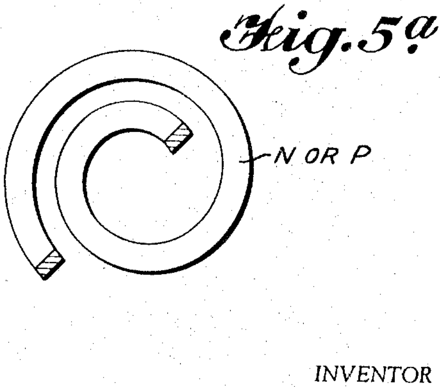

Small inductances, suitable for high frequency use, may also be made by shaping the semiconductor as evidenced by FIGURE 5*a* which shows a spiral of semiconductor material. It is also possible to prepare photosensitive, photoresistive, solar cells and other like components utilizing the basic design considerations outlined above.

Although all of the circuit elements have been described in terms of a single diffused layer, it is quite possible to use a double diffused structure. Double diffusion may thus provide both n-p-n or p-n-p structures. Also, any suitable materials can be employed for the semiconductor materials, conductivity producing impurities, and contact materials. Also, suitable and known processing can be used to produce the above circuit designs.

Because all of the circuit designs described above can be formed from a single material, a semiconductor, it is possible by shaping to integrate all of them into a single crystal semiconductor wafer containing a diffused p-n junction, or junctions, and to process the wafer to provide the proper circuit and the correct component values. Junction areas for the transistors, diodes, and capacitors are formed by properly shaped "mesas" on the wafer.

A specific illustration of an electronic circuit embodying the principles of the invention is shown in FIGURE 6*a*. As shown, a thin wafer of single crystal semiconductor material containing a diffused p-n junction has been processed and shaped to include a complete and integrated multivibrator electronic circuit formed essentially in one surface of the wafer. The regions of the wafer have been marked with symbols representative of the circuit element functions that are performed in the various regions. FIGURE 6*b* shows a wiring diagram of the various circuit functions in the relationship which they occupy in the wafer of FIGURE 6*a*. A more conventionally drawn circuit diagram is shown in FIGURE 7 with the circuit values actually used. The multivibrator circuit shown in FIGURES 6*a*, 6*b* and 7 will be described as illustrative of the processing techniques required. First, a semiconducting wafer, preferably silicon or germanium, of the proper resistivity is lapped and polished on one side. For this design, 3 ohm-cm. p-type germanium was used.

The wafer was then subjected to an antimony diffusion process which produced an n-type layer on the surface about 0.7 mil deep. The wafer was then cut to the proper size, 0.200 x 0.080 and the unpolished surface was lapped to give a wafer thickness of 0.0025 inch.

Gold plated Kovar leads 50 were atached by alloying to the wafer in the proper positions. Kovar is a trade name for an iron-nickel-cobalt alloy. Gold was then evaporated through a mask to provide the areas 51–54 which provide ohmic contact with the n-region, such as the transistor base connections and the capacitor contacts. Aluminum was evaporated through a properly shaped mask to provide the transistor emiter areas 56, which form rectifying contacts with the n-layer.

The wafer was then coated with a photosenstive resist or lacquer, such as Eastman Photo Resist, supplied by Eastman Kodak Company, and exposed through a negative to a light. The lacquer image remaining after development was used as a resist for etching the wafer to the proper shape. In particular, this etching forms a slot through the wafer to provide isolation between $R_1$ and $R_2$ and the rest of the circuit, and also shapes all of the resistor areas to the previously calculated configuration. Either chemical etching or electrolytic etching may be used, although electrolytic etching appears to be preferable.

After this step, the photoresist was removed with a solvent, and the mesa areas 60 masked by the same photographic process. The wafer was again immersed in etchant, and the n-layer completely removed in the exposed areas. A chemical etch is considered preferable. The photoresist was then removed.

Gold wires 70 were then thermally bonded to the appropriate areas to complete the connections, and a final clean-up etch given. Instead of using the gold wires 70 in making electrical connections, connections may be provided in other ways. For example, an insulating and inert material such as silicon oxide may be evaporated onto the semiconductor circuit wafer through a mask either to cover the wafer completely except at the points where electrical contact is to be made thereto, or to cover only selected portions joining the points to be electrically connected. Electrically conducting material such as gold may then be laid down on the insulating material to make the necessary electrical circuit connections.

After testing, the circuit may be hermetically sealed, if required, for protection against contamination. The finished device was smaller by several orders of magnitude than any others which have previously been proposed. Because the fabrication steps required are quite similar to those now used in manufacturing transistors, and because of the relatively small number of steps required, these devices are inherently inexpensive and reliable, as well as compact.

A further illustration of the process hereof is shown in FIGURES 8*a*–8*c*. Each area of the single crystal semiconductor wafer has been marked with a symbol for the circuit element which it represents. This unit illustrates the use of resistors, transistors, and a distributed R–C network to form a complete phase shift oscillator.

It must be emphasized that the two embodiments described above are merely two of innumerable circuits which can be fabricated by the techniques of the present invention. There is no limit upon the complexity or configuration of circuits which can be made in this manner. While there is a limit upon the types and values of components which can be made in a limited space, the invention hereof nevertheless represents a remarkable improvement over the prior art. As evidence of the advance in the art accomplished by the present invention, it is possible using the techniques described above to achieve component densities of greater than thirty million per cubic foot as compared with five hundred thousand per cubic foot which is the highest component densities attained prior to this invention.

Although the invention has been shown and described in terms of specific embodiments, it will be evident that changes and modifications are possible which do not in fact depart from the inventive concepts taught herein. Hence, such changes and modifications are deemed to fall within the purview of the invention.

What is claimed is:

1. In a method of manufacturing an integrated circuit of the type having a plurality of active and passive circuit components in a body of semiconductor material, the steps of forming a layer of oxide on a semiconductor wafer, applying a layer of highly conductive material over at least part of said layer of oxide to provide one plate of a capacitor which employs said oxide as its dielectric, and providing a nonrectifying contact to the semiconductor material subjacent the oxide which immediately underlies said layer of conductive material.

2. In a method according to claim 1, said semiconductor being silicon and said oxide being formed by thermally oxidizing said silicon.

3. In a method according to claim 1, said layer of highly conductive material being a metal layer formed by evaporation techniques.

4. The method of making an electrical capacitor having a dielectric film of silicon oxide which comprises providing a body of silicon, treating at least one of the surfaces of said body to provide a thin silicon oxide film thereon, subsequently applying capacitor electrodes to opposed surfaces of said body including said at least one surface, and attaching electrical connections to said electrodes.

No references cited.

WILLIAM I. BROOKS, *Primary Examiner.*

WHITMORE H. WILTZ, *Examiner.*